United States Patent Office 2,881,140
Patented Apr. 7, 1959

---

2,881,140

RUST INHIBITING COMPOSITION

Robert W. Schrum, Lansing, Ill., assignor to Sinclair Refining Company, New York, N.Y., a corporation of Maine No Drawing. Application June 23, 1955
Serial No. 517,641

4 Claims. (Cl. 252—395)

This invention relates to new compositions of matter and in particular relates to defined oxidate-containing compositions. The compositions of the present invention are especially useful for rust inhibiting purposes, particularly in petroleum applications.

Paraffin wax oxidates are known to be excellent rust inhibitors for distillate fuels, e.g., gasoline. Typical of these oxidates are oxidates of crystalline petroleum wax, such as slack wax or other paraffin wax, and oxidates of foots oil fractions such as are disclosed in pending application Serial No. 410,709, filed February 16, 1954, of John Walter Nelson, now U. S. Patent No. 2,776,309. Oxidates of petroleum wax comprise oil-soluble, water-insoluble $C_{18}+$ acids and oxygenated acids which are solid in their normal state while oxidates of foots oil fractions are waxy solids which are oil-soluble, water-insoluble and comprise mono- and di-basic acids, hydroxy acids, normal esters and other oxygen-containing organic compounds and hydrocarbons in a wide range of molecular weights. Before use crude oxidates normally are purified to remove inorganic compounds formed by catalysts, remove low molecular weight corrosive acids, recover dibasic acids and to improve color and odor. An advantageous purification procedure is disclosed in pending application Serial No. 410,711, filed February 16, 1954, of John Walter Nelson, now U.S. Patent No. 2,723,988, as is applied to foots oil oxidates.

The use of oil-soluble aromatic sulfonates as rust inhibitors for petroleum applications such as pipeline products transmission also is well known. Particularly advantageous examples of such sulfonates include the alkali metal, alkaline earth metal and ammonium mahogany sulfonates and neutralized sulfonated bottoms from the manufacture of dodecylbenzene. Frequently mixtures of the oxidates and oil-soluble aromatic sulfonates are employed, especially when synergistic activity of the resulting mixture is evidenced. Thus, in the pending application Serial No. 464,873, filed October 26, 1954, of Ray C. Smith, it is disclosed that mixtures of foots oil oxidates and ammonia neutralized sulfonated bottoms from the manufacture of dodecylbenzene are especially advantageous rust inhibitors for petroleum applications in that synergistic activity is evidenced.

For convenient and satisfactory use of the oxidates as rust inhibitors in distillate fuels or other petroleum products, either alone or in admixture with oil-soluble aromatic sulfonates, a concentrate in a suitable solvent which can be conveniently added to the distillate fuel to be inhibited is desirable. Such a concentrate must have a low pour point, advantageously about 20° F. and below, to maintain low temperature fluidity. Moreover, the resulting concentrate must be clear and should be of high flash point, e. g., above about 110° F.

It has been discovered that solutions containing paraffin wax oxidates such as foots oil oxidates and crystalline wax oxidates can be produced which are clear and are characterized by low pour points. It has also been discovered that compositions comprising solutions of paraffin wax oxidates in a solvent can be incorporated in petroleum distillate fractions to impart anti-corrosive properties to the distillate fractions. It has also been discovered that concentrates containing oil-soluble aromatic sulfonates and the defined paraffin wax oxidates such as foots oil oxidates and crystalline wax oxidates, having low pour points, can be produced. These advantages are obtained by the addition of a small amount of a substantially dehydrated partially oxidized microcrystalline wax, i. e. petrolatum, to a solution of an oxidate alone or an oxidate and oil-soluble aromatic sulfonates in defined solvents effective to lower the pour point of the resulting solution.

Thus compositions of this invention comprise, in one embodiment, clear, bright concentrates of paraffin wax oxidate such as an oxidate of a foots oil fraction or a crystalline paraffin wax oxidate and a small amount of a substantially dehydrated partially oxidized microcrystalline wax in a suitable solvent. More particularly, these novel compositions comprise essentially about 5 to 65 weight percent of the defined oxidate, about 0.1 to 4 weight percent of a partially oxidized microcrystalline wax and about 35 to 95 weight percent of a solvent. In another embodiment, the compositions comprise clear, bright concentrates of the defined oxidate, oil-soluble aromatic sulfonates and a small amount of a partially oxidized microcrystalline wax in a suitable solvent. Compositions including the defined sulfonates generally contain the respective components as follows: about 5 to 15 weight percent of oxidate, about 15 to 30 weight percent of the sulfonated material, about 0.1 to 4 weight percent of partially oxidized microcrystalline wax and about 50 to 80 weight percent of a solvent. The compositions described also can include a small amount of a polar solvent to facilitate solubility of the defined oxidate and to aid in stabilizing the solutions. The polar solvents which can be employed are high boiling alcohols, ketones, ethers, or Cellosolves, which are ethylene glycol alkyl-substituted ethers, of a boiling point of at least 212° F. Methyl and butyl Cellosolves are particularly advantageous. The polar solvent generally is used in amounts equivalent to about 0.1 to 2 or more weight percent of the total composition.

In general the compositions of the present invention are prepared by addition of the components in any order. Desirably, the oxidates are dispersed in the hydrocarbon solvent at a temperature of about room temperature to 100° C. while stirring and then the sulfonates, if any, and the microcrystalline wax are added and the temperature maintained until solution is complete. In the alternative, the oxidate and microcrystalline wax can be premixed and added to the solvent conjointly. Of course where the sulfonate is employed it too can be premixed with the oxidized microcrystalline wax and the oxidate and the entire mixture then blended into the solvent.

The microcrystalline wax oxidates useful in this invention are obtained by partially oxidizing microcrystalline wax fractions obtained from various crudes, i. e., Mid-Continent, mixed base or paraffinic, according to known processes. The oxidates of microcrystalline wax advantageously are prepared by the oxidation procedure disclosed in the patent of John Walter Nelson No. 2,610,974, though any other known process can be employed if desired. Thus, a microcrystalline wax can be contacted with oxygen, either in the pure form or in the presence of diluents, such as in air, at an elevated temperature in excess of 100° C. Advantageously, an oxidation catalyst, such as ammonium vanadate, potassium permanganate or various manganese salts, is employed in the process. The microcrystalline wax is not completely oxidized as the microcrystalline wax oxidate employed in the present invention must have a saponification number within certain defined limits. For this invention oxidation is stopped when control tests of the mass indicate the saponification number is about 15 to 200. Upon purification as by a dilute acid wash, the oxidates evidence a saponification number within the necessary range, i.e., about 10 to about 150. The oxidate is then dried, for example, by air blowing, until the water content is at least below about 1.0 percent. The resulting partially oxidized microcrystalline wax having a saponification number of about 10 to 150 and being substantially dehydrated, i.e., having a water content of less than 1.0 weight percent, is employed in the present invention.

The paraffin wax oxidates are used in amounts of about 5 to 65 weight percent, and preferably 15 to 65 percent, based on the composition. Foots oil oxidates are obtained by the controlled oxidation of foots oil fractions obtained from slack wax. The fractions obtained from a resweating step in the sweating of slack wax are particularly advantageous; fractions obtained by the solvent, e.g., methylethyl ketone, de-oiling of slack wax are also useful. Advantageous foots oil fractions to be oxidized are characterized by a melting point within the range of about 80 to 120° F., an oil content of about 3 to 30 percent and an API gravity of about 30 to 45.

The foots oil oxidates are prepared by subjecting a foots oil fraction to large amounts of air or oxygen at an elevated temperature, i. e., above about 250° F., in the presence of about 0.2 to 1.7 weight percent of an oxidation catalyst, e.g., potassium permanganate, for a period of time sufficient to effect substantially complete oxidation of the foots oil. For example, a foots oil fraction obtained as described above and having a melting point of about 80 to 120° F., an oil content of about 3 to 30 percent and an API gravity of about 30 to 45 is oxidized with oxygen in the presence of potassium permanganate. The reaction is carried out at about 250 to 300° F. with, for example, about 40 liters of oxygen per kilogram of foots oil per hour using about 0.85 percent by weight of potassium permanganate. The reaction is continued until the oxidation is substantially complete, for example, until the reaction mixture has a saponification number of about 250 to 300. The oxidate is then separated, for example, by filtration.

The foots oil oxidates are characterized by a relatively low melting point within the range of about 80 to 95° F., an API gravity of about 10 to 25 and a saponification number of about 200 to 325. The crude oxidates have a saponification number of about 250 to 325. When purified by filtration, washing with water containing hydrochloric acid and steam stripping, the purified oxidates have a melting point within the range of about 80 to 95° F., an API gravity of about 10 to 25 and a saponification number of about 200 to 250. Also, the acid number of the crude oxidate is lowered from about 150 to 200 to about 100 to 150 for the purified oxidate. The oxidates are waxy solids that are light amber to brown in color and are characterized by improved stability, good oil solubility and good rust inhibiting properties.

Preparation of other paraffin wax oxidates, such as slack wax oxidates, to be used in the invention also can be accomplished according to known processes. For example, a crystalline wax having an ASTM petrolatum melting point of about 130.1° F., API gravity of 42.7°, zero saponification and acid numbers and a kinematic viscosity at 175° F. of about 4.932 can be oxidized to a product for use in the present invention by contacting the wax with oxygen, either substantially pure or in the presence of diluents such as in air. Advantageously, about 40 liters of substantially pure oxygen per hour per kilogram of wax in the presence of a water solution of about 0.5 to 1.0 weight percent of a catalyst such as potassium permanganate are used to effect the oxidation. Temperatures of about 100 to 200° C. and especially about 130 to 150° C. are employed. The resulting crude products advantageously are purified by water washing, acid washing, and steam stripping and upon purification normally evidence a saponification number of about 200 to 500, for example 240 to 350, depending upon the degree of completion of the oxidation effected. For purposes of the present invention, it is desirable that substantially complete oxidation be effected though, of course, products having other degrees of oxidation can be employed. A typical purified oxidized crystalline paraffin wax which can be employed in the invention has the following properties: ASTM petrolatum melting point of 114° F., saponification number of 246.7, acid number of 153.0, API gravity of 23.2°, and a water content of about 0.12 weight percent.

Oil-soluble aromatic sulfonates to be used in the present invention are well-known articles of commerce. An advantageous procedure for obtaining satisfactory sulfonates comprises sulfonating an aromatic hydrocarbon containing petroleum fraction, such as a suitable gas oil or lubricating oil, with a sulfonating agent such as fuming sulfuric acid or sulfur trioxide, separating the sludge and green acids from the resulting oil layer and neutralizing the sulfonic acids contained in the oil layer with a suitable neutralizing agent such as calcium or barium, preferably employed as the oxide or hydroxide. Specific conditions of contact time, temperatures, pressures, ratios of sulfonating agent to feed and the like are known in the art.

Ammonia neutralized sulfonated bottoms from the manufacture of dodecylbenzene constitute the preferred oil-soluble aromatic sulfonates to be employed in this invention and are articles of commerce obtained, for example, as Bryton ammonium sulfonate from the Bryton Chemical Company. The materials which are sulfonated and neutralized are derived from the bottoms resulting in the production of dodecylbenzene (Neolene), and specifically are the bottoms remaining after fractionation to remove the monododecylbenzene cut from the reaction products of dodecene with benzene. These bottoms are wide boiling range mixtures consisting essentially of didodecylbenzene along with other polyalkylated benzene molecules and olefin polymers such as low molecular weight polymers of dodecene. The mixture is produced by alkylating benzene with dodecene according to known procedures, for example, by the liquid phase contacting of dodecene and benzene at about 50 to 300° C., and a pressure of 5 to 50 atmospheres in the presence of an alkylation catalyst such as aluminum chloride or sulfuric acid or the like. The bottoms are then obtained by fractionating monododecylbenzene and lighter constituents from the reaction mass.

The Neolene bottoms are sulfonated and neutralized with ammonia according to known processes such as that described in U.S. Patent 2,671,757 to Wisherd. Sulfonation can be accomplished by adding 20 percent oleum to a charge of bottoms maintained at about 75 to 175° F. in a Monel sulfonator. After the oleum is added, the resulting acid mass is washed and the sulfonic acids are separated, i.e., by settling. The sulfonated material is then neutralized by contacting with ammonia by conventional procedures. The resulting neutralized sulfonated material is a semi-viscous fluid which is miscible in all proportions in fluids such as kerosene, gasoline and low viscosity white oils and similar hydrocarbon solvents.

Solvents which can be employed in producing the concentrates of the instant invention are hydrocarbon solvents and preferably petroleum hydrocarbon solvents. Particular solvents include kerosene, toluene, xylene, aromatic petroleum fractions and extracts, and paraffinic petroleum fractions. The ordinary refinery-produced solvents such as the various naphthas, or reformate cuts and the like are also advantageous.

As pointed out above, the compositions of the present invention are especially useful as anti-corrosion additives in light petroleum distillate fractions, i.e. gasoline, fuel oil, diesel oil and the like. Advantageously, about 1.5 to 25 pounds of the compositions per 1000 barrels of the distillate fraction, and preferably about 2 to 15 pounds per 1000 barrels are employed for most purposes.

The invention will be illustrated further with reference to the following examples. It should be understood that the details disclosed are not to be considered as limiting the invention.

EXAMPLE I

About 2200 grams of a microcrystalline wax derived from a Sweet West Texas crude were charged into a reactor flask. About 1.0% by weight of potassium permanganate dissolved in about 100 ml. of water was added to the wax and the mixture was heated to about 150° C. to remove solvent water. About 1.0% by weight of "seed," a product from a previous run, was added. The mixture was then reacted at about 149° C. in the presence of about 40 liters per hour per kilogram of wax of substantially pure oxygen. During the course of the reaction a water layer and an acid layer were taken off overhead. Samples of the oxidate were taken periodically and saponification and acid numbers determined. A sample taken at the expiration of three hours had a saponification number of 28.1 and an acid number of 11.3.

The three hour sample was cooled and then washed with HCl to remove manganese salts and then with water to remove acid. The product was dried by blowing with air at 80° C. Analysis of the resulting product showed 0.20% water, 0.004% manganese, a saponification number of 23.0 and an acid number of 9.64.

To demonstrate the effect of various microcrystalline wax oxidates, solutions of an oxidate of a foots oil fraction in an aromatic petroleum hydrocarbon solvent were made. The characteristics of the foots oil oxidate were:

Saponification No. ------------------------------ 234
Acid No. ------------------------------------- 129
Pour point, ° F. ------------------------------ 95
°API gravity ----------------------------- 22
Flash point, ° F. ------------------------------ 375

The characteristics of the aromatic petroleum hydrocarbon solvent employed, hereinafter referred to as the aromatic solvent, were:

Gravity, °API ------------------------------ 33.5
Flash, ° F. ----------------------------------- 123
Odor ------------------------------------- Good
Appearance --------------------------------- Bright
Doctor test (ASTM D 484) ---------------- Negative
Mixed Aniline P.T., ° C. (ASTM D 611 or D 1012) ------------------------------------- 30.5

Distillation (ASTM D 86):
  Initial, ° F. ------------------------------ 333
  10%, ° F. -------------------------------- 338
  50%, ° F. -------------------------------- 345
  90%, ° F. -------------------------------- 360
  End point, ° F. --------------------------- 383

Partially oxidized microcrystalline wax was added to the foots oil oxidate solutions. The results are as follows:

Table I.—Pour points in ° F.

| Concentration and Saponification Number of Microcrystalline Wax Oxidate [1] | Concentration of Foots Oil Oxidate Solutions (wt. percent of oxidate) | |
| --- | --- | --- |
| | 35% | 30% |
| None | 45 | 45 |
| Saponification No. 23, 1% | 45 | 30 |
| Saponification No. 23, 2% | 25 | −15 |
| Saponification No. 92, 1% | 40 | 15 |
| Saponification No. 92, 2% | 10 | −15 |

[1] Each oxidate contained less than 1.0 weight percent water.

In a similar series of tests, inhibitor solutions of a foots oil oxidate and ammonia neutralized sulfonated bottoms from the manufacture of dodecylbenzene were made by adding varying amounts of a solution of 35 weight percent foots oil oxidate in the aromatic solvent to a solution of 35 weight percent ammonia neutralized sulfonated bottoms in kerosene. One percent of a substantially dehydrated partially oxidized microcrystalline wax having a saponification number of 135 was added to each solution and the pour points of the resulting solutions were determined. The data obtained are:

Table II.—Pour Points

| Percent Foots Oil Oxidate Solution [1] | Without Additive | With Additive |
| --- | --- | --- |
| 20 | −15 | −70 |
| 30 | 25 | −70 |
| 40 | 35 | −65 |
| 50 | 40 | −65 |
| 60 | 50 | −20 |

[1] Based on total solution.

The data in Tables I and II demonstrate the results which can be expected according to the present invention. It is also apparent that the most desirable amount of the partially oxidized microcrystalline wax to be employed in any instance is determined by a consideration of both the degree of oxidation of the microcrystalline wax as evidenced by its saponification number, and the concentration of the oxidate, i.e. foots oil oxidate, present.

To demonstrate the effect of the water content of the partially oxidized microcrystalline wax on the pour point of the compositions, a solution containing 30 pounds of a foots oil oxidate and 69 pounds of the aromatic petroleum solvent was made. To 10 pound samples of this solution, 0.1 pound of partially oxidized microcrystalline wax was added. The characteristics of the partially oxidized wax employed in each sample and the pour points obtained are:

Table III.—Microcrystalline wax oxidate

| Solution No. | Sap No. | Percent H₂O | Pour Point, ° F. |
| --- | --- | --- | --- |
| 1 | 108 | 1.58 | 35 |
| 2 | 108 | 0.29 | −15 |
| 3 | 130 | 3.15 | 45 |
| 4 | 139 | 0.06 | 20 |

From these data, it is clear that the water content of a partially oxidized wax must be limited to obtain satisfactory pour points. Thus, the high water contents of 1.58 and 3.15% were substantially without effect as regards pour points of the tested solutions.

Tests were conducted to determine the concentrations of oxidized microcrystalline wax necessary. The oxidized microcrystalline wax employed had a saponification number of 92; an aromatic solvent and foots oil oxidate essentially as described in Example I were employed as a test solutions. The data obtained are:

Table IV

| Weight Percent Oxidized Microcrystalline Wax | Concentration of Foots Oil Oxidate, Wt. Percent | Pour Point, ° F. |
| --- | --- | --- |
| 0 | 30 | 45 |
| 0.5 | 30 | 35 |
| 2 | 30 | −15 |

In general, with the solutions containing a larger concentration of the foots oil oxidate, larger quantities of the partially oxidized microcrystalline wax are needed to obtain any given pour point reduction. Other tests have shown, however, that large amounts of the partially oxidized microcrystalline wax, i.e. on the order of 10 percent or more, did not effect a pour point lowering.

I claim:

1. A composition consisting essentially of about 5 to 65 weight percent of a foots oil oxidate, about 50 to 95 weight percent of a hydrocarbon solvent and about 0.1 to 4 weight percent of a substantially dehydrated partially oxidized microcrystalline wax having a saponification number of about 10 to 150.

2. A composition consisting essentially of about 50 to 95 weight percent of an aromatic hydrocarbon solvent, about 5 to 65 weight percent of an oxidate of a foots oil fraction and about 0.1 to 4 weight percent of a substantially dehydrated partially oxidized microcrystalline wax having a saponification number of about 10 to 150, said foots oil oxidate having a melting point of about 80 to 95° F., an API gravity of about 10 to 25 and a saponification number of about 200 to 325.

3. A composition consisting essentially of about 5 to 15 weight percent of a foots oil oxidate, about 15 to 30 weight percent of an oil-soluble aromatic sulfonate, about 50 to 80 weight percent of a hydrocarbon solvent, and 0.1 to 4 weight percent of a substantially dehydrated partially oxidized microcrystalline wax having a saponification number of about 10 to 150.

4. A composition consisting essentially of about 5 to 15 weight percent of a foots oil oxidate, about 15 to 30 weight percent of an ammonia neutralized sulfonated bottoms from the manufacture of dodecylbenzene, about 50 to 80 weight percent of kerosene and about 0.1 to 4 weight percent of a substantially dehydrated partially oxidized microcrystalline wax having a saponification number of about 10 to 150, said foots oil oxidate having a melting point of about 80 to 95° F., an API gravity of about 10 to 25 and a saponification number of about 200 to 325.

References Cited in the file of this patent

UNITED STATES PATENTS

| | | |
|---|---|---|
| 2,209,165 | Martin et al. | July 23, 1940 |
| 2,632,694 | Watkins | Mar. 24, 1953 |
| 2,667,408 | Kleinholz | Jan. 26, 1954 |
| 2,671,051 | Moore | Mar. 2, 1954 |
| 2,671,757 | Wisherd | Mar. 9, 1954 |
| 2,671,759 | Eckert | Mar. 9, 1954 |
| 2,682,553 | Kirk | June 29, 1954 |
| 2,705,241 | McKinley | Mar. 29, 1955 |
| 2,727,005 | McKinley et al. | Dec. 13, 1955 |